United States Patent [19]

Yoshida

[11] Patent Number: 5,966,430

[45] Date of Patent: Oct. 12, 1999

[54] COMMUNICATION APPARATUS CAPABLE OF COMMUNICATING DATA AND SPEECH SELECTIVELY THROUGH SINGLE COMMUNICATION LINE

[75] Inventor: Takehiro Yoshida, Tokyo, Japan

[73] Assignee: Canon Kabushiki Kaisha, Tokyo, Japan

[21] Appl. No.: 08/990,921

[22] Filed: Dec. 15, 1997

Related U.S. Application Data

[63] Continuation of application No. 08/454,422, May 30, 1995, abandoned.

[30] Foreign Application Priority Data

May 30, 1994 [JP] Japan ................................. 6-139337

[51] Int. Cl.$^6$ ................................................. H04M 11/00
[52] U.S. Cl. ........................... 379/100.15; 379/93.09; 379/100.17
[58] Field of Search ........................ 379/93.09, 93.05, 379/93.11, 93.14, 100.15, 100.16, 100.17

[56] References Cited

U.S. PATENT DOCUMENTS

| | | |
|---|---|---|
| 4,475,010 | 10/1984 | Huensch et al. . |
| 4,527,284 | 7/1985 | Röttger . |
| 4,677,660 | 6/1987 | Yoshida ................................. 379/100 |
| 4,696,027 | 9/1987 | Bonta . |
| 4,704,734 | 11/1987 | Menich et al. . |
| 4,797,947 | 1/1989 | Labedz . |
| 4,800,439 | 1/1989 | Yoshino ................................. 358/257 |
| 5,019,840 | 5/1991 | Watanabe et al. ...................... 346/134 |

(List continued on next page.)

FOREIGN PATENT DOCUMENTS

| | | | |
|---|---|---|---|
| 409186840 | 12/1995 | Japan ............................... H04N 1/32 |
| 409186838 | 7/1997 | Japan ............................... H04N 1/32 |

OTHER PUBLICATIONS

"ITU-T Recommendation V.8", International Telecommunication Union, Sep. 1994.

"A proposed extension to draft V.8 to assist fax/tel switching", ITU Study Group 14, Dec. 15, 1993, Orlando.

"Draft V.8" ITU Study Group 14, Dec. 15, 1993, Orlando.

M. Gudmundson, "Cell Planning In Manhattan Environments," in *Proceedings: 42nd IEEE Vehicular Technology Conference*, (Denver, Co.), May 10–13, 1992.

S.T.S. Chia, "The Control of Handover Initiation In Microcells," in *Proceedings: 41st IEEE Vehicular Technology Conference*, pp. 531–536, 1991.

W. Webb, L. Hanzo, R.A. Salami, R. Steele, "Does 16–QAM Provide An Alternative To A Half–Rate GSM Speech Codec?", Dept. of Electr. & Comp. Sc., Univ. of Southampton, U.K. S09 5NH.

Mark D. Austin, Gordon L. Stüber, "Velocity Adaptive Handoff Algorithms for Microcellular Systems", IEEE Transactions On Vehicular Technology, vol. 43, No. 3, Aug. 1994.

Colloquium on "Propagation Aspects of Future Mobile Systems" at Savoy Place on Friday Oct. 25, 1996, Ref:96/220.

A Murase, I.C. Symington, and E. Green, "Handover Criterion For Marco And Microcellular Systems", *Proceedings: 41st IEEE Vehicular Technology Conference*, (St.Louis, MO), 1991.

*Primary Examiner*—Curtis A. Kuntz
*Assistant Examiner*—Melur Ramakrishnaiah
*Attorney, Agent, or Firm*—Fitzpatrick Cella Harper & Scinto

[57] ABSTRACT

A facsimile apparatus has a plurality of switching modes including a first mode to select facsimile communication or speech communication in accordance with a V.8 protocol signal and a second mode to select the facsimile communication or the speech communication in accordance with a call signal pattern and selects one of the switching modes to switch between the facsimile communication and the speech communication.

11 Claims, 10 Drawing Sheets

U.S. PATENT DOCUMENTS

| | | |
|---|---|---|
| 5,038,399 | 8/1991 | Bruckert . |
| 5,067,147 | 11/1991 | Lee . |
| 5,113,432 | 5/1992 | Van Santbrink et al. ............... 379/100 |
| 5,175,867 | 12/1992 | Wejke et al. . |
| 5,179,559 | 1/1993 | Crisler et al. . |
| 5,189,696 | 2/1993 | Yoshida ................................... 379/355 |
| 5,255,311 | 10/1993 | Yoshida ................................... 379/100 |
| 5,267,261 | 11/1993 | Blakeney, II et al. . |
| 5,278,991 | 1/1994 | Ramsdale et al. . |
| 5,280,472 | 1/1994 | Gilhousen et al. . |
| 5,280,630 | 1/1994 | Wang . |
| 5,317,623 | 5/1994 | Sakamoto et al. . |
| 5,345,467 | 9/1994 | Lomp et al. . |
| 5,345,499 | 9/1994 | Benveniste . |
| 5,379,446 | 1/1995 | Murase . |
| 5,379,447 | 1/1995 | Bonta et al. . |
| 5,392,453 | 2/1995 | Gudmundson et al. . |
| 5,396,541 | 3/1995 | Farwell et al. . |
| 5,404,574 | 4/1995 | Benveniste . |
| 5,422,933 | 6/1995 | Barnett et al. . |
| 5,432,842 | 7/1995 | Kinoshita et al. . |
| 5,471,522 | 11/1995 | Sells et al. ................................ 379/97 |
| 5,487,101 | 1/1996 | Fletcher . |
| 5,490,177 | 2/1996 | La Rosa et al. . |
| 5,491,834 | 2/1996 | Chia . |
| 5,491,837 | 2/1996 | Haartsen . |
| 5,499,386 | 3/1996 | Karlsson . |
| 5,499,387 | 3/1996 | Chambert . |
| 5,504,936 | 4/1996 | Lee . |
| 5,509,051 | 4/1996 | Barnett et al. . |
| 5,517,674 | 5/1996 | Rune . |
| 5,521,719 | 5/1996 | Yamada ..................................... 379/100 |
| 5,535,259 | 7/1996 | Dent et al. . |
| 5,539,744 | 7/1996 | Chu et al. . |
| 5,542,098 | 7/1996 | Bonta . |
| 5,546,443 | 8/1996 | Raith . |
| 5,555,445 | 9/1996 | Booth . |
| 5,557,657 | 9/1996 | Barnett . |
| 5,559,866 | 9/1996 | O'Neill . |
| 5,570,467 | 10/1996 | Sawyer . |
| 5,812,281 | 9/1998 | Mukai ..................................... 358/435 |
| 5,890,806 | 4/1999 | Yoshida .............................. 379/100.06 |

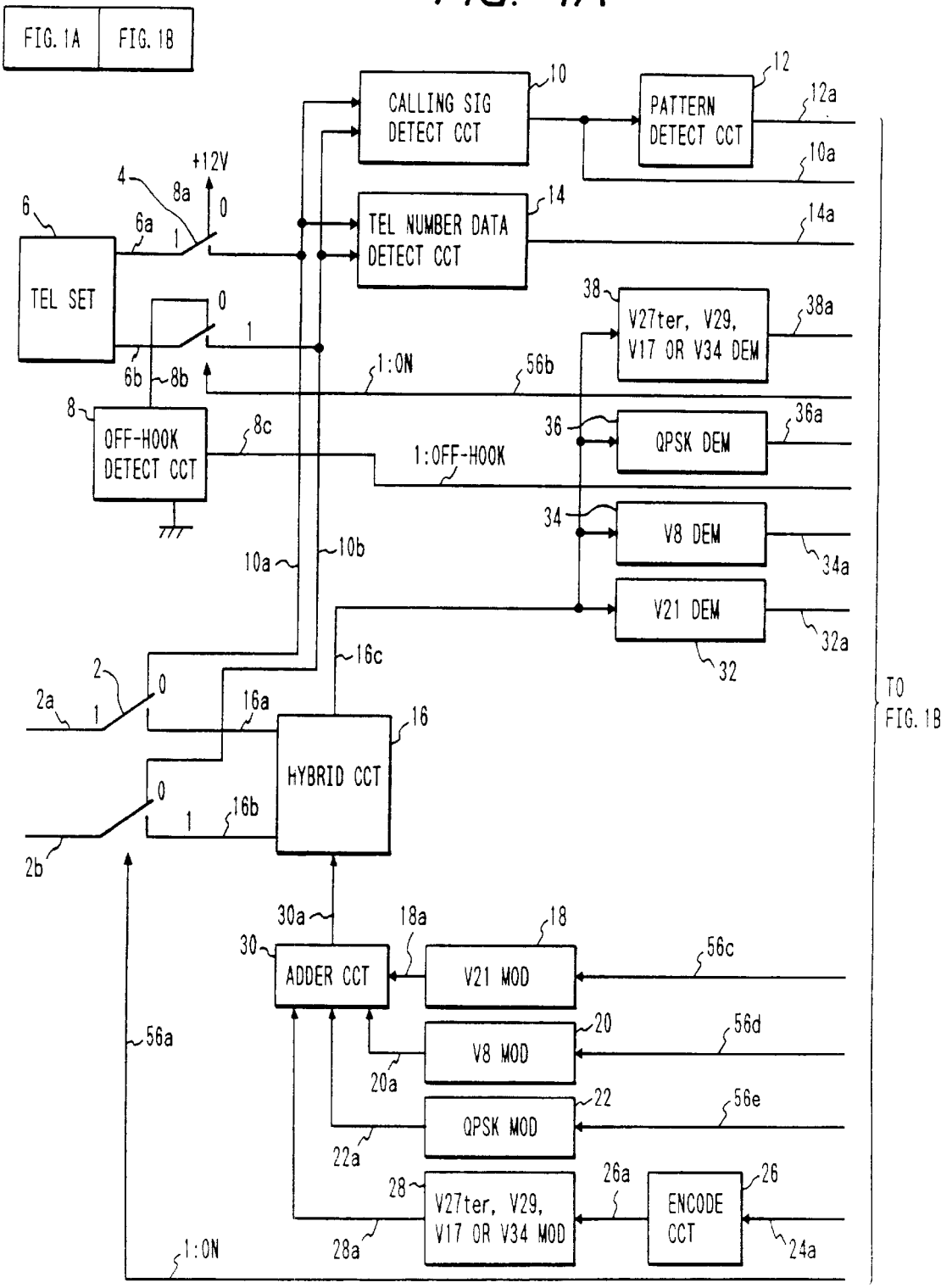

1 PERIOD

1 PERIOD

1 PERIOD

1 PERIOD

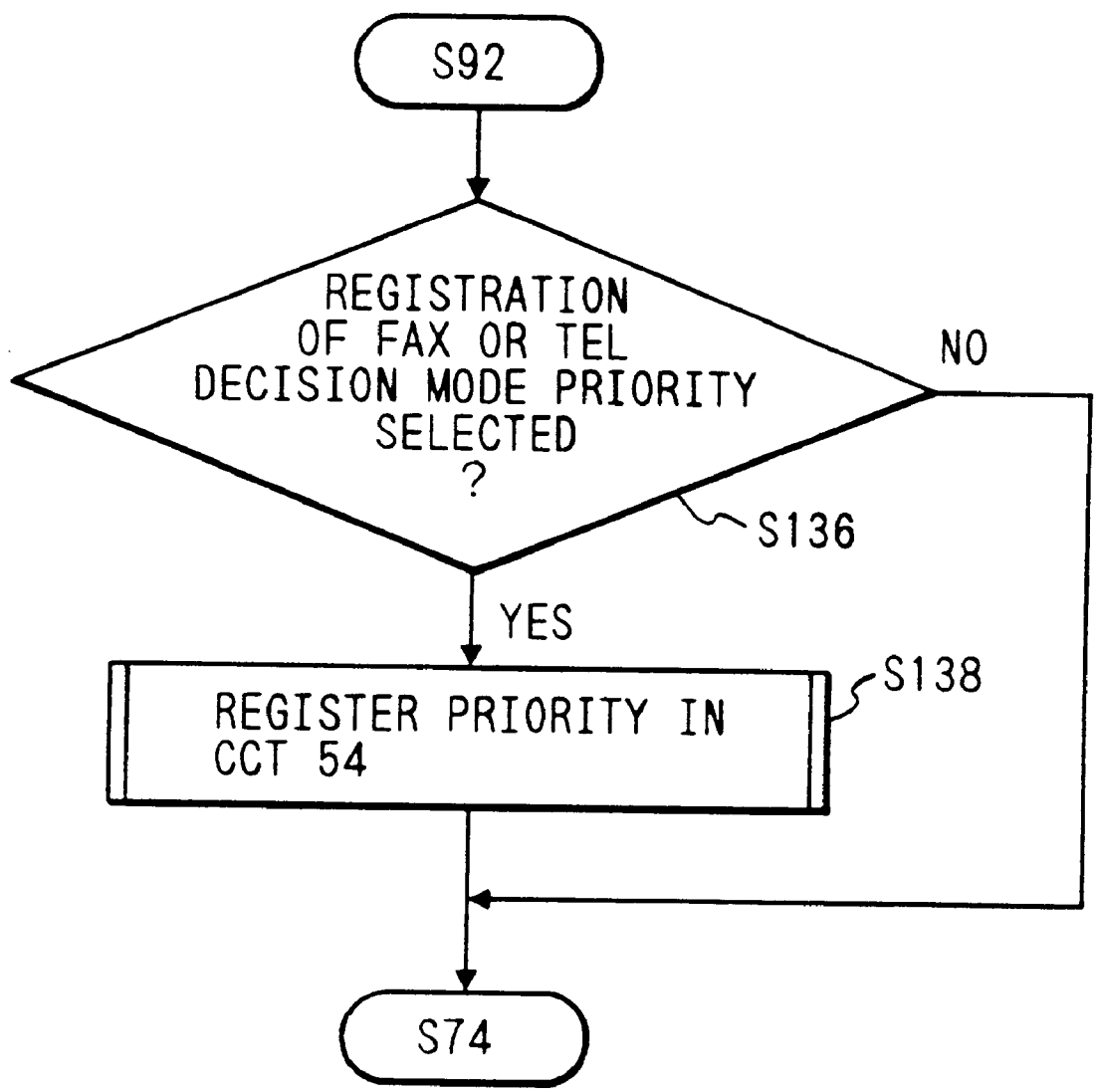

COMMUNICATION APPARATUS CAPABLE OF COMMUNICATING DATA AND SPEECH SELECTIVELY THROUGH SINGLE COMMUNICATION LINE

This application is continuation of Ser. No. 08/454,422, May 30, 1995 abandoned.

BACKGROUND OF THE INVENTION

1. Field of the Invention

The present invention relates to a communication apparatus capable of selectively communicating data and speech through a single communication line.

2. Related Background Art

A facsimile apparatus is known as an apparatus of this type. In a prior art facsimile apparatus, in order to selectively use a single telephone line for facsimile communication and speech communication, when a signal received from the line is a facsimile signal, it is determined that a sending station is a facsimile apparatus and the facsimile communication is started. Such an apparatus is described in U.S. Pat. No. 5,019,840 and U.S. Pat. No. 4,800,439.

A service to allocate a plurality of telephone numbers to one telephone line and send out call signals corresponding to the respective telephone numbers (e.g. call signals having different cadences) by an exchange is known. A facsimile apparatus which utilizes this service while assigning a telephone number for speech communication and a telephone number for facsimile communication and identifying call signals for the facsimile apparatus to select the facsimile communication or the speech communication also is known.

On the other hand, data communication between computers and image data communication by a facsimile apparatus have recently been conducted through a public telephone line and communication with various types of modems has been conducted. A modem for computer data communication and a modem for a facsimile apparatus are incompatible and cannot communicate with each other. Thus, where communication is to be conducted through a telephone line, it is required to identify the type of terminal of a destination station when a line is connected with the destination station, and a new communication is to be applied to achieve the communication.

The prior art facsimile apparatus merely has independent functions to switch the facsimile communication and the speech communication and merely utilizes those functions independently. Thus, the facsmile apparatus may not properly switch the facsimile communication and the speech communication for the calls from various types of facsimile apparatus as above mentioned or telephone sets.

SUMMARY OF THE INVENTION

It is an object of the present invention to provide an improved communication apparatus.

It is another object of the present invention to provide a communication apparatus capable of properly switching data communication and speech communication for a call from a communication apparatus having the new communication protocol described above.

It is still another object of the present invention to provide a communication apparatus which has a plurality of switching modes including a first mode for selectively conducting the data communication and the speech communication in accordance with a type of call signal and a second mode for selectively switching the data communication and the speech communication by using the new communication protocol, and which selects an appropriate switching mode when it receives a call and selectively conducts the data communication and the speech communication in accordance with the selected switching mode to properly conduct the data communication and the speech communication.

Other objects of the present invention will be apparent from the following detailed description of the preferred embodiments and the accompanying drawings.

BRIEF DESCRIPTION OF THE DRAWINGS

FIG. 6 is a flow chart of an operation of a second embodiment.

DETAILED DESCRIPTION OF THE PREFERRED EMBODIMENTS

Embodiments of the present invention are now described in detail in conjunction with the drawings. In the following embodiments, a facsimile apparatus is illustrated and the V.8 protocol using a V.8 modem based of the ITU Recommendation V.8 is used as a new protocol for identifying a terminal attribute. In the V.8 protocol, as will be described in detail later, a protocol signal for identifying the terminal attribute is communicated. In the present embodiment, when it is determined by the protocol signal that the sending station is a telephone set, a communication line (telephone line) is connected to the telephone set for speech communication, and when it is determined that the sending station is a facsimile apparatus, facsimile communication is conducted.

Figure 1B:
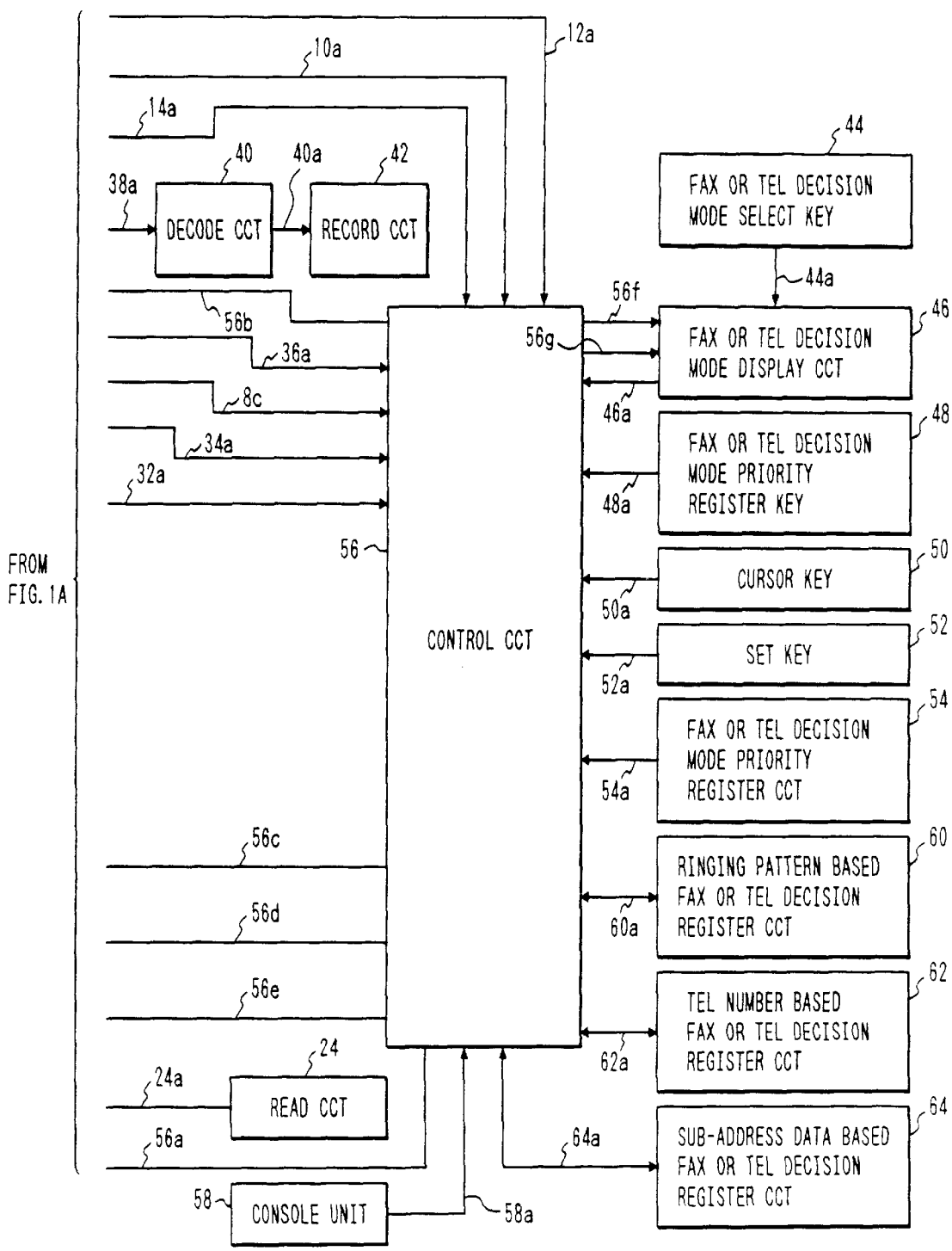
FIG. 1 is composed of FIGS. 1A and 1B, and forms a block diagram of an embodiment of the present invention.

FIGS. 1A and 1B taken together forms a block diagram of a configuration of a facsimile apparatus of the present embodiment.

A CML 2 is a relay for switching a telephone line to a facsimile communication unit and a telephone set. When a signal of a signal level '0' is outputted on a signal line 56a, a telephone line (signal lines 2a and 2b) is connected to the telephone set 6 (signal lines 10a and 10b), and when a signal of signal level '1' is outputted on the signal line 56a, the telephone line (the signal lines 2a and 2b) is connected to the facsimile communication unit (signal lines 16a and 16b).

A TEL relay 4 is a relay for detecting non-ringing call reception and off-hook during communication. When a signal of signal level '0' is outputted on a signal line 56b, signal lines 6a and 6b are connected to signal lines 8a and 8b, and when a signal of signal level '1' is outputted on the signal line 56b, the signal lines 6a and 6b are connected to the signal lines 10a and 10b. When the signal of signal level '0' is outputted on the signal line 56b, an off-hook detection circuit 8 determines if the telephone set 6 is off hook off or not, and if it is off hook, a signal of signal level '1' is outputted to a signal line 8c, and if it is on hook, a signal of signal level '0' is outputted to the signal line 8c.

A call signal detection circuit 10 receives the signals outputted on the signal lines 10a and 10b, and when it detects a call signal (ringing signal), it outputs a signal of signal level '1' on the signal line 10a, and when it does not detect the call signal, it outputs a signal of signal level '0' on the signal line 10a.

Figure 2A:
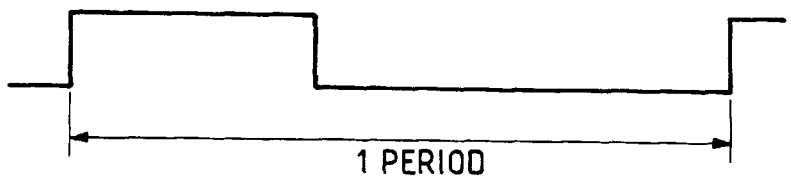
FIGS. 2A to 2D show ringing patterns used in the embodiment.
Figure 2B:
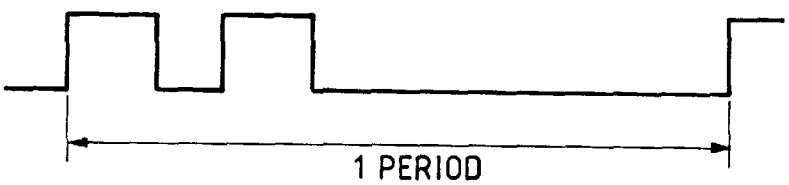
Figure 2C:
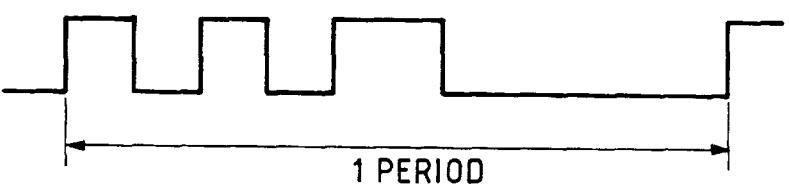
Figure 2D:
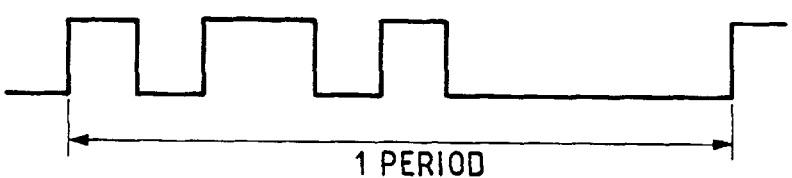

A call signal pattern detection circuit 12 checks the detection signal for the call signal on the signal line 10a to detect a ringing pattern. When a standard ringing pattern (one on-state CI in one period) as shown in FIG. 2A is detected, it outputs a signal '0' on the signal line 12a, and when a double ringing pattern (two on-state CI's in one period) as shown in FIG. 2B is detected, it outputs a signal '1' on the signal line 12a, and when a triple ring pattern (short-short-long; three on-state CI's in one period) as shown in FIG. 2C is detected, it output a signal '2' on the signal line 12a, and when a triple ring pattern (short-long-short; three on-state CI's in one period) as shown in FIG. 2D is detected, a signal '3' is outputted on the signal line 12a.

A telephone number information detection circuit 14 detects telephone number information sent between call signals and outputs detected telephone number information to a signal line 14a.

A hybrid circuit 16 separates a signal of a transmission unit and a signal of a receiving unit and sends a transmission signal from an adder circuit 30 to the telephone line through the signal lines 16a, 16b and the CML 2, receives a signal from a sending station through the CML 2 and the signal lines 16a and 16b, and sends it to demodulators 32, 34, 36 and 38 through a signal line 16c.

A V.21 modulator 18 modulates in accordance with the ITU-T Recommendation V.21. The modulator 18 modulates a protocol signal (signal line 56c) from a control unit 56 and sends the modulated signal to the adder circuit 30 through a signal line 18a.

A V.8 modulator 20 modulates in accordance with V.8 which is under discussion for recommendation. The modulator 20 receives the protocol signal on a signal line 56d, modulates the protocol signal and outputs the modulated data on a signal line 20a.

A Q.PSK modulator 22 conducts a page-to-page protocol of image transmission in accordance with V.fast which is under discussion for recommendation. The modulator 22 receives a protocol signal on a signal line 56e, modulates the protocol signal and outputs the modulated data on a signal line 22a.

A read circuit 24 sequentially reads one line of image signal along a main scan direction from a document sheet to be transmitted, generates a signal sequence representing binary, black and white values, and sends the data from a signal line 24a to an encoding circuit 26. The read circuit 24 comprises an image pickup device such as a CCD (change coupled device) and an optical system.

The encoding circuit 26 receives the read data outputted on the signal line 24a, encodes the read data (MH, MR or MMR coding) and outputs the encoded data from a signal line 26a.

A V.27ter, V.29, V.17 and V.34 modulator 28 receives the encoded data from the signal line 26a, modulates the encoded data in accordance with the known ITU-T Recommendation V.27ter (differential phase modulation), V.29 (quadrature modulation), V.17 or V.35 which is under discussion for recommendation, and outputs the modulated data to the adder circuit 30 through a signal line 28a.

The adder circuit 30 receives signals on the signal lines 18a, 20a, 22a and 28a and adds them. An output of the adder circuit 30 is sent to the hybrid circuit 16 from a signal line 30a.

The V.21 demodulator 32 demodulates in accordance with the ITU-T Recommendation V.21. The demodulator 32 receives a protocol signal from the hybrid circuit 16 through the signal line 16c, demodulates the protocol signal in accordance with V.21 and sends the demodulated data to the control unit 56 through a signal line 32a.

The V.8 demodulator 34 demodulates in accordance with V.8 which is under discussion for recommendation. The demodulator 34 receives the signal on the signal line 16c, demodulates the received signal in accordance with V.8 and outputs the demodulated data on a signal line 34a.

The Q.PSK demodulator 36 conducts page-to-page protocol of image transmission in accordance with V.fast which is under discussion for recommendation. The demodulator 36 receives the signal on the signal line 16c, demodulates the received signal in accordance with Q.PSK and outputs the demodulated data on the signal line 36a.

The V.27ter, V.29, V.17 and V.34 demodulator 38 demodulates in accordance with the known ITU-T Recommendation V.27ter, V.29, V.17 or V.34 which is under discussion for recommendation. The demodulator 38 receives the modulated image signal from the hybrid circuit 16, demodulates the image signal and sends the demodulated data to a decoding circuit 40 through a signal line 38a.

The decoding circuit 40 receives the information outputted on the signal line 38a and outputs decoded data (MH, MR or MMR decoding) to a recording circuit 42 through a signal line 40a.

The recording circuit 42 receives the data outputted on the signal line 40a and sequentially records the received data one line at a time.

A selection button 44 selects means (or more) by which it is determined whether the facsimile communication is to be conducted or the speech communication is to be conducted when a call is received. When the button 44 is depressed, a depression pulse is generated on a signal line 44a.

A display circuit 46 displays means by which it is determined whether the facsimile communication is to be conducted or the speech communication is to be conducted when the call is received.

In the present embodiment, when a set pulse is generated on a signal line 56g while the signal '0' is outputted on a signal line 56f, the means is determined by the ringing pattern of the call signal, and when the set pulse is generated on the signal line 56g while the signal '1' is outputted on the signal line 56f, the means is determined by the telephone number information between call signals, and when the set pulse is generated on the signal line 56g while the signal '2' is outputted on the signal line 56f, the means is determined by the sub-address information attribute information by the V.8 protocol signal. Each time the depression pulse is generated on the signal line 44a, the display is shifted one by one from "determination by call signal ringing pattern" to "determination by telephone number information between call signals" to "determination by sub-address information by a V.8 protocol signal".

When the display circuit 46 displays "determination by call signal ringing pattern", it outputs the signal '0' on a signal line 46a, and when it displays "determination by telephone number information between call signals", it outputs the signal '1' on the signal line 46a, and when it displays "determination by sub-address information by V.8 protocol signal", it outputs the signal '2' on the signal line 46a.

A registration button 48 is used to register a priority for means by which it is determined whether the facsimile communication is to be conducted or the speech communication is to be conducted when the call is received. When the button 48 is depressed, a depression pulse is generated on a signal line 48a.

When a cursor key 50 is depressed, a depression pulse is generated on a signal line 50a. When a set key 52 is depressed, a depression pulse is generated on a signal line 52a.

A register circuit 54 registers the priority selected by the button 48 and the keys 50, 52 through a signal line 54a.

An operation unit or console unit 58 has a ten-key, one-touch dial keys, abbreviation dial keys and other function keys for registering in circuits 60, 62 and 64 whether to conduct the facsimile communication or the speech communication when the call is received, correspondingly to the call signal ringing pattern (first mode), the telephone number between call signals (third mode) and the terminal attribute information or sub-address information by the V.8 protocol signal (second mode), respectively, and the depression information is outputted on a signal line 58a.

The registration circuit 60 registers through a signal line 60a, when a fax/tel switching method (the first mode) to select the facsimile communication or the speech communication by the call signal ringing pattern is selected by the circuit 46 or 54, whether the facsimile communication is to be conducted or the speech communication is to be conducted in accordance with the four call signal ringing patterns when the call signal is received.

The registration circuit 62 registers through a signal line 62a, when a fax/tel switching method (the third mode) for selecting the facsimile communication or the speech communication by the telephone number information between call signals is selected by the circuit 46 or 54, whether the facsimile communication is to be conducted or the speech communication is to be conducted in accordance with the telephone number information between call signals when the call signal is received.

The registration circuit 64 registers through a signal line 64a, when a fax/tel switching method (the second mode) to select the facsimile communication mode or the speech communication mode by the attribute information or the sub-address information of the V.8 protocol signal is selected by the circuit 46 or 54, whether the facsimile communication is to be conducted or the speech communication is to be conducted in accordance with the sub-address information by the V.8 protocol signal when the call is received.

The control unit 56 selects an appropriate switching mode from the above-mentioned plural switching modes when the call is received and controls the switching of the facsimile communication and the speech communication in accordance with the selected switching mode. The plurality of switching modes include the first mode by the call signal ringing pattern, the third mode by the telephone number information between call signals and the second mode by the V.8 protocol signal.

FIGS. 3 to 5B are flow charts of a control operation of the control circuit 56 in a first embodiment of the present invention. In the present embodiment, the circuits 48, 50, 52 and 54 are not used.

In S72, a signal '0' is outputted on the signal line 56f and then a set pulse is outputted on the signal line 56g to display the determination by call signal ringing pattern on the display circuit 46 for the fax/tel switching method.

In S74, a signal of signal level '0' is outputted on the signal line 56a to deactivate the CML relay 2. In S76, a signal of signal level '0' is outputted on the signal line 56b to deactivate the TEL relay 4.

In S78, the information on the signal line 58a is received to determine whether the registration of the fax/tel switching by the call signal ringing pattern (the first mode, MODE 1) has been selected or not, and if it has been selected, the process proceeds to S80 to register in the circuit 60 whether the facsimile communication is to be conducted or the speech communication is to be conducted when the call is received in accordance with the four call signal ringing patterns, and if it has not been selected, the process proceeds to S82.

In S82, the information on the signal line 58a is received to determine whether the registration of the fax/tel switching by the telephone number between call signals (the third mode, MODE 3) has been selected or not, and if it has been-selected, the process proceeds to S84 to register in the circuit 62 whether the facsimile communication is to be conducted or the speech communication is to be conducted when the call is received in accordance with the telephone number between call signals, and if it has not been selected, the process proceeds to S86.

In S86, the information on the signal line 58a is received to determine whether the registration of the fax/tel switching by the attribute information or the sub-address information sent from the calling terminal device as the V.8 protocol signal (the second mode, MODE 2) has been selected or not, and if it has been selected, the process proceeds to S88 to register in the circuit 64 whether the facsimile communication is to be conducted or the speech communication is to be conducted when the call is received in accordance with the attribute information or the sub-address information sent from the calling terminal device as the V.8 protocol signal, and if it has not been selected, the process proceeds to S90.

In S90, the information outputted on the signal line 10a is received to determine whether the call signal has been detected or not, and if it has been detected, the process proceeds to S94, and if it has not been detected, the process proceeds to S92 to conduct other process.

In S94, the signal on the signal line 46a is received and the information of the fax/tel switching method display circuit 46 is received to identify the selected fax/tel switching method. When the signal '0' is outputted on the signal line 46a, it means that the fax/tel switching is to be conducted by the call signal ringing pattern and the process proceeds to S96, and when the signal '1' is outputted on the signal line 46a, this means that the fax/tel switching is to be conducted by the telephone number information between call signals and the process proceeds to S108, and when the signal '2' is outputted on the signal line 46a, this means that the fax/tel switching is to be conducted by the sub-address information sent from the calling terminal device as the V.8 protocol signal and the process proceeds to S112.

In S96, the information on the signal line 12a is received to recognize the call signal ringing pattern. In S98, the information on the circuit 60 is received to determine whether the detected call signal ringing pattern is for the facsimile communication or not, and if it is for the facsimile communication, the process proceeds to S100, and if it is for the speech communication, it proceeds to S104.

In S100, a signal of signal level '1' is outputted on the signal line 56a to activate the CML relay 2, and in S102, the facsimile communication is conducted. Then, the process returns to S72.

In S104, a signal of signal level '1' is outputted on the signal line 56b to activate the TEL relay 4, and in S106, the speech communication is conducted. Then, the process returns to S72.

In S108, the telephone number information between call signals outputted on the signal line 14a is received to identify the telephone number between call signals. In S110, the information of the circuit 62 is received to determine whether the detected telephone number information between call signals is for the facsimile communication or the speech communication. If the information is for the facsimile communication, proceed to S100, and if the information is for the speech communication, proceed to S104.

In S112, a signal of signal level '1' is outputted on the signal line 56a to activate the CML relay 2, and in S114, the pre-protocol by V.8 is conducted. The sub-address information attribute information sent from the calling terminal device is recognized.

In S116, the information of the circuit 64 is received to determine whether the detected sub-address information by the V.8 protocol signal is for facsimile communication or not. When the information is for facsimile communication, the process proceeds to S118 to conduct facsimile communication and the process returns to S74.

When the information is for speech communication, the process proceeds to S120 to call an operator by a circuit, not shown. The operator call may be stopped by the off-hook indication or the elapse of a predetermined time interval.

In S122, a signal of signal level '1' is outputted on the signal line 56b to activate the TEL relay 4, and in S124, speech communication is conducted. When off-hook is detected, the CML relay 2 is activated. Then, the process returns to S74.

A second embodiment of the present invention is now described.

In the first embodiment, there is a case where the signal necessary for switching may not be detected when the call is received in the switching mode selected from a plurality (three) of switching modes. In the second embodiment, a priority to use the plurality (three) of switching modes is set in the circuit 54 and the facsimile apparatus is controlled in accordance with the use priority and the signal received when the call is received. In the present embodiment, the circuits 44 and 46 of FIG. 1B are not necessary.

FIGS. 6 to 8B show portions of the operation of the second embodiment of the present invention which are different from that of the first embodiment.

In FIGS. 6 to 8B, one of the first, second and third priority terminal information is sent.

Figure 3:
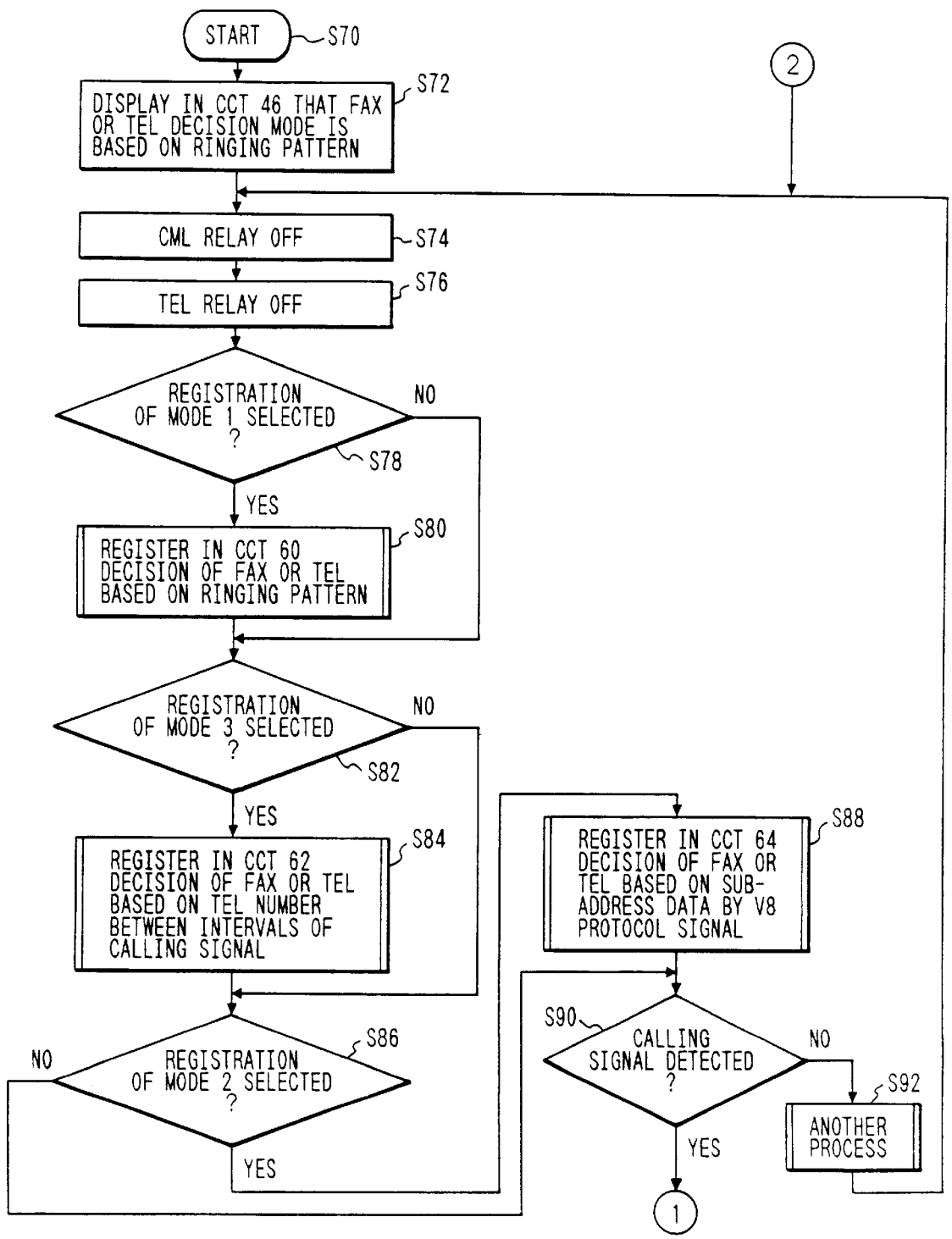
FIG. 3 is a flow chart of an operation of a first embodiment of the present invention.

In the second embodiment, S73 of FIG. 3 is omitted.

The process proceeds from S92 of FIG. 3 to S136 of FIG. 6. In S136, the information on the signal lines 48a, 50a and 52a are received to determine whether the registration of the priority for the fax/tel switching method has been selected or not. If it has been selected, the process proceeds to S138 to register the priority for the fax/tel switching at the reception of the call in the circuit 54, and if it has not been selected, the process proceeds to S74 of FIG. 3.

Figures 7, 7A:
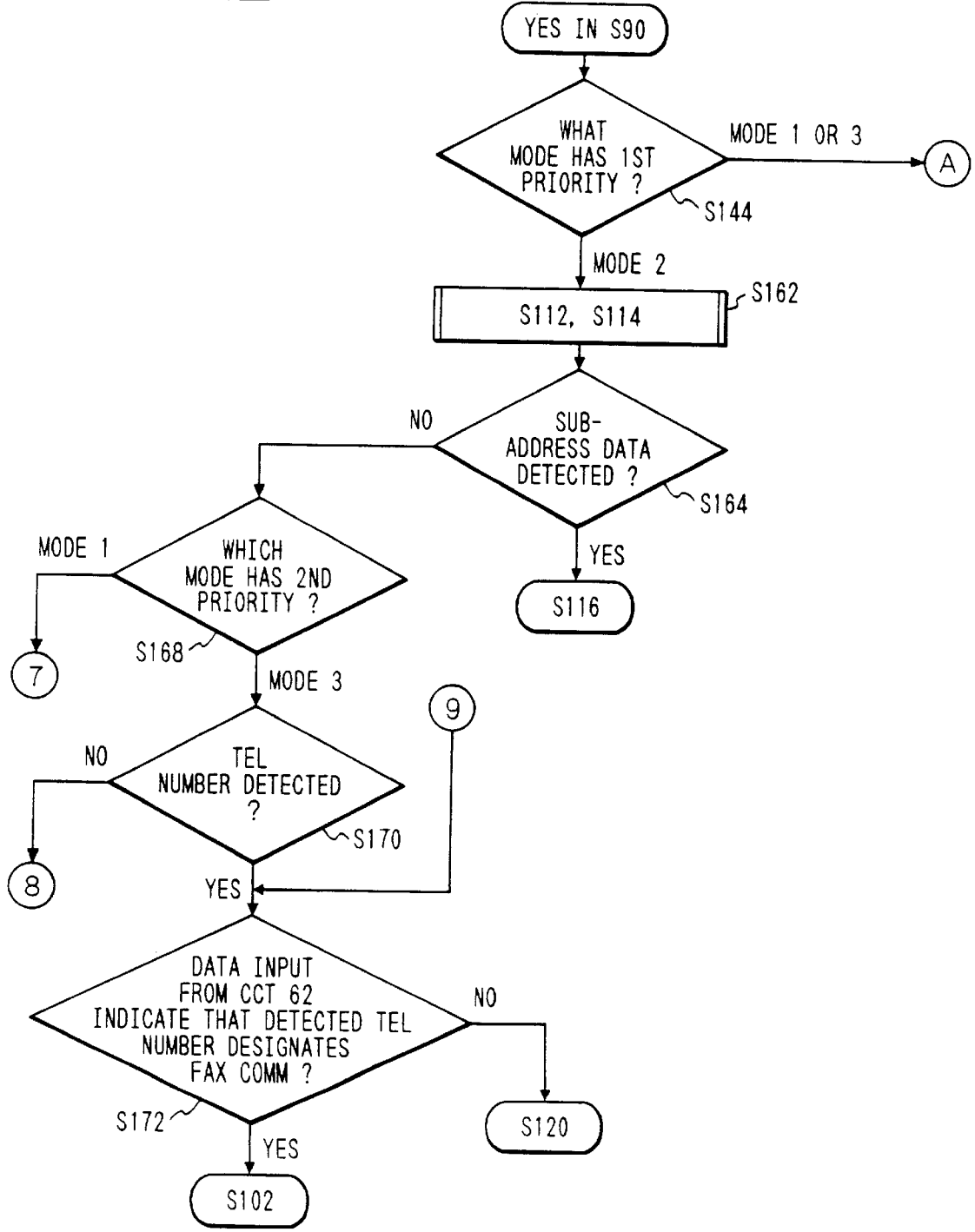
FIG. 7 is composed of FIGS. 7A and 7B, and is a flow charts of an operation of the second embodiment, and FIGS. 8A and 8B taken together is a flow charts of an operation of the second embodiment.
Figure 7B:
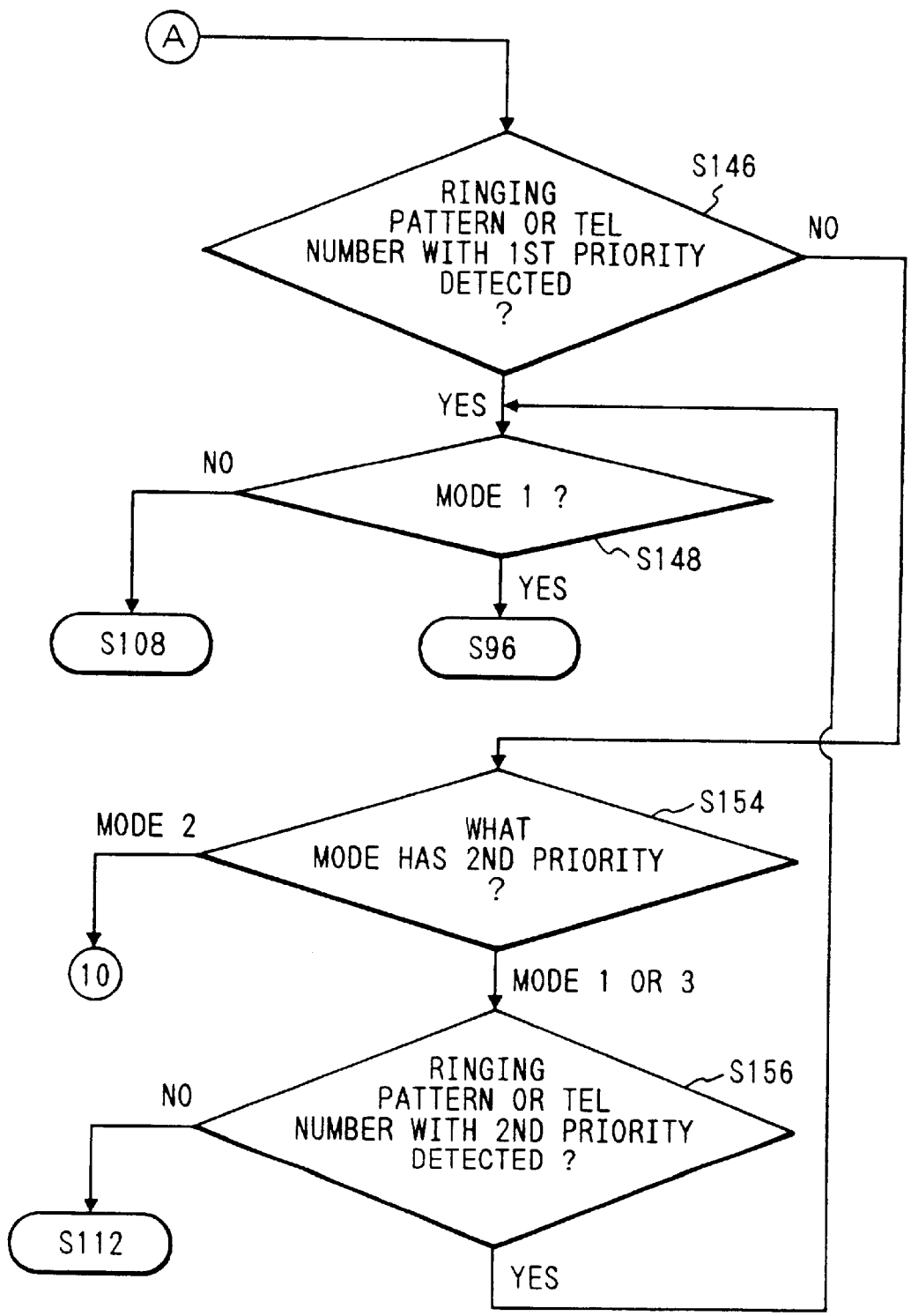
Figure 8A:
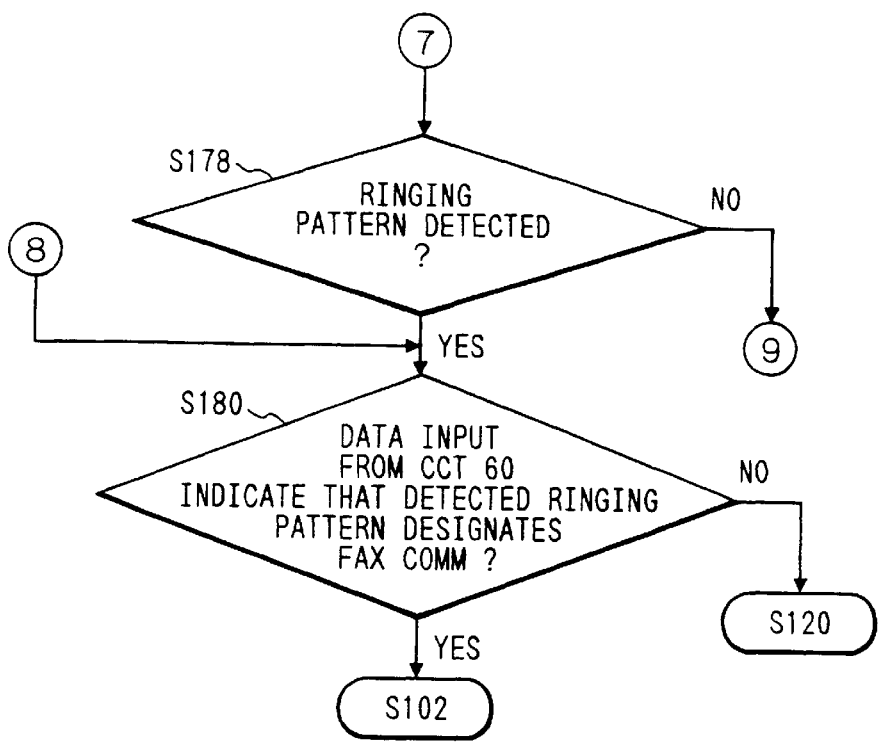
Figure 8B:
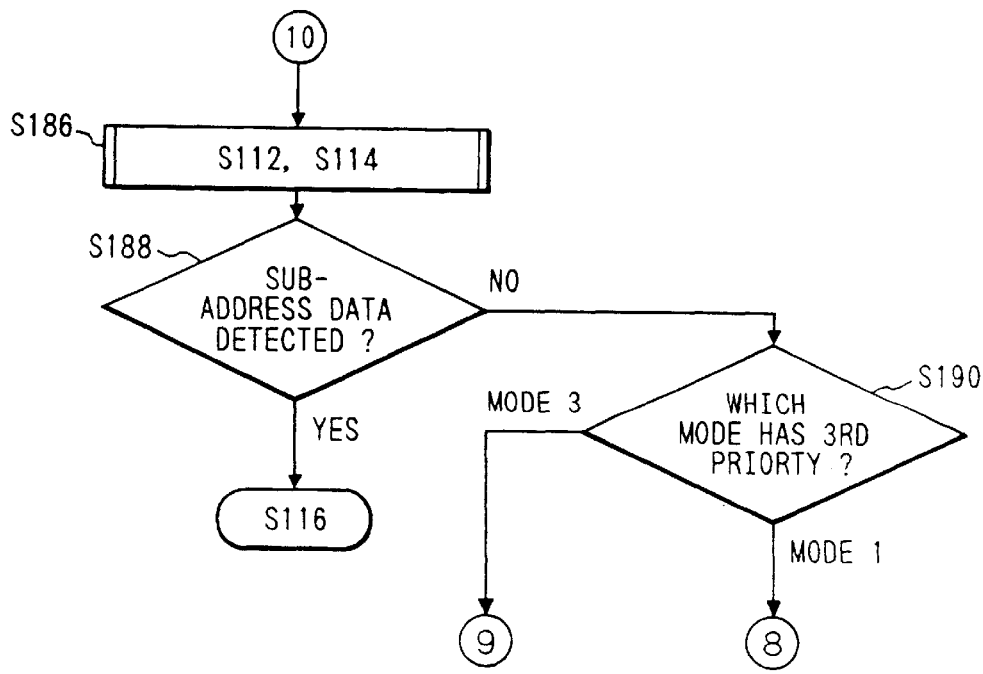

The process proceeds from YES of S90 of FIG. 3 to S144 of FIG. 7A. In S144, the information of the circuit 54 is received to check the first priority for the fax/tel switching method. If the information is the sub-address information by the V.8 protocol signal, the process proceeds to S162. Otherwise, the process proceeds to S146.

In S146, whether the first call signal priority ringing pattern or telephone number between call signals designated by the circuit 54 is present or not is determined. If it is present, the process proceeds to S148, and if it is not present, the process proceeds to S154.

Figure 4:
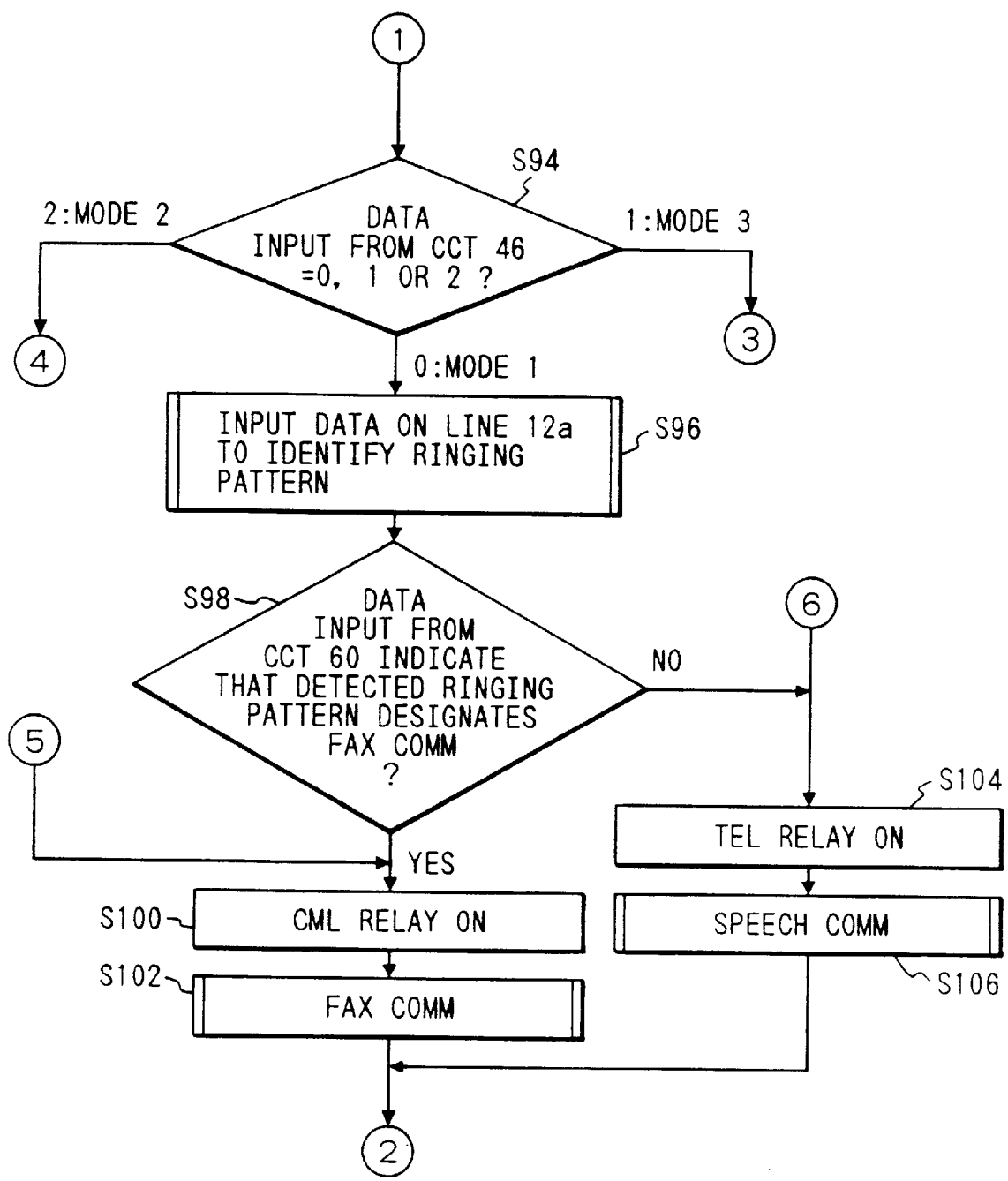
FIG. 4 is a flow chart of an operation of the first embodiment, FIGS. 5A and 5B form a flow chart of an operation of the first embodiment.
Figure 5A:
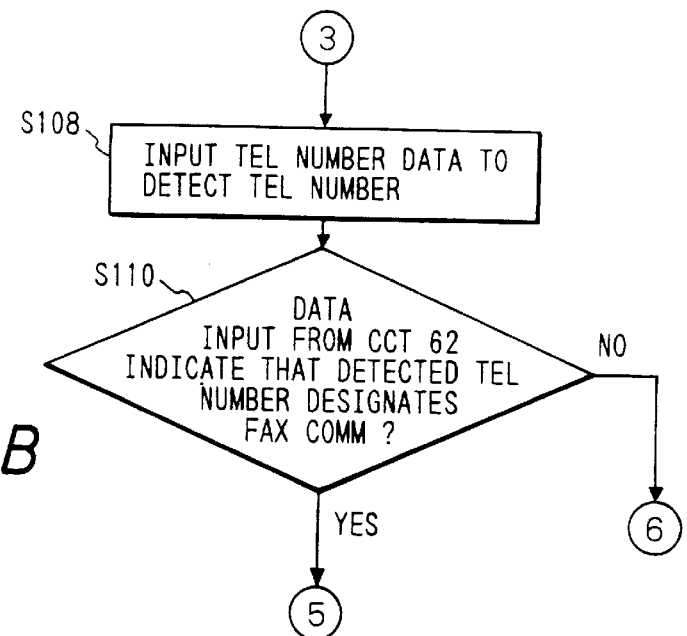

In S148, which is the first priority (YES of S146) or second priority (YES of S156) of the fax/tel switching method is determined, and if the method is the call signal ringing pattern, the process proceeds to S96 of FIG. 4, and if the method is the telephone number between call signals, the process proceeds to S108 of FIG. 5A.

In S154, the information of the circuit 54 is received to check the second priority of the fax/tel switching method. If the information is the sub-address information by the V.8 protocol signal, the process proceeds to S186. Otherwise, the process proceeds to S156.

In S156, whether the call signal ringing pattern or the telephone number between call signals designated as the second priority of the fax/tel switching method is present or not is determined. If the method is present, the process proceeds to S148, and if the method is not present, the process proceeds to S112 of FIG. 5B.

Figure 5B:
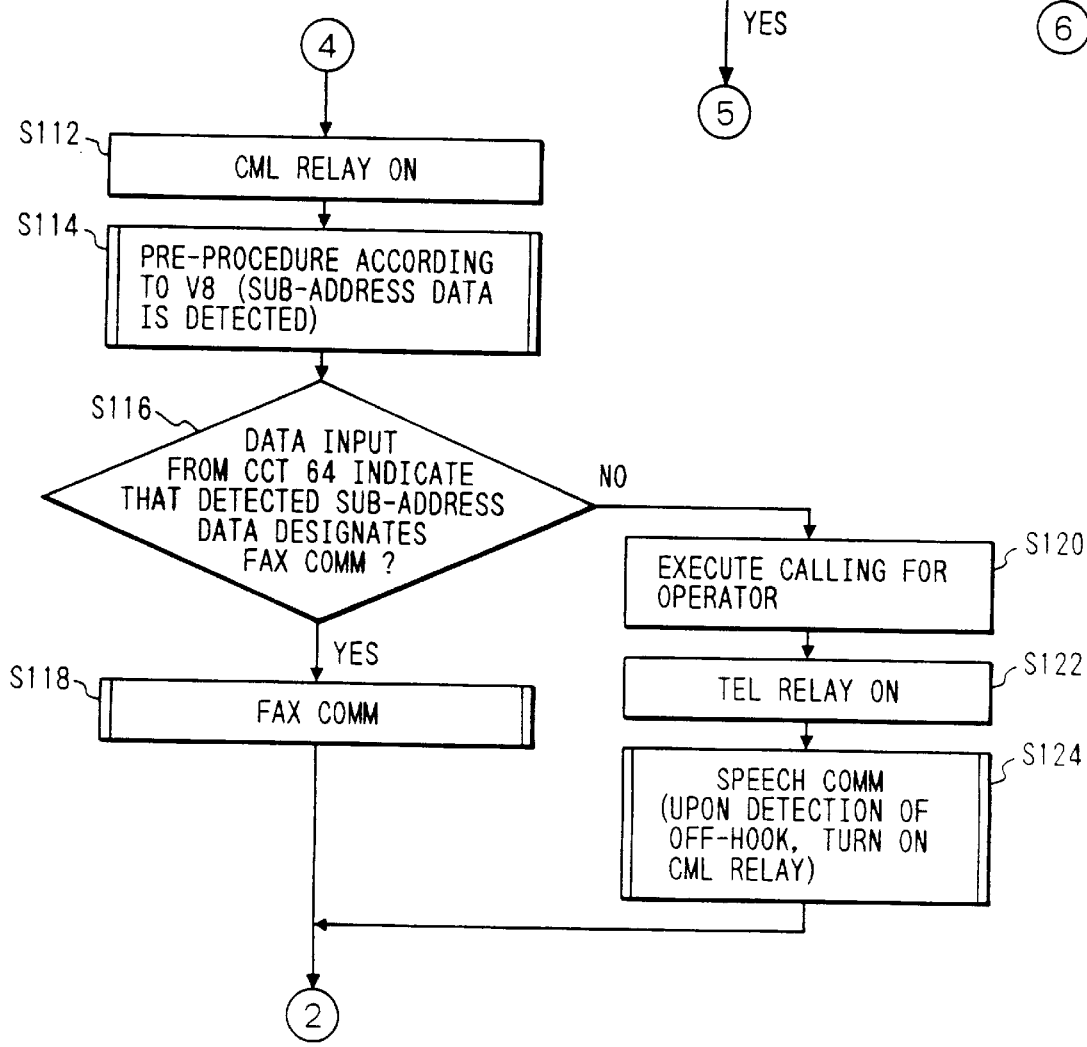

In S162, a similar process to that of S112 and S114 of FIG. 5B is conducted. In S164, whether the attribute information or the sub-address information by the V.8 protocol signal has been detected or not is determined. If detected, the process proceeds to S116 of FIG. 5B, and if not detected, the process proceeds to S168.

In S168, the information of the circuit 54 is received to check the second priority of the fax/tel switching method. If the information is the call signal ringing pattern, the process proceeds to S178, and if the information is the telephone number between call signals, the process proceeds to S170.

In S170, whether the telephone number between call signals has been detected or not is determined. If detected, the process proceeds to S172, and if not detected, the process proceeds to S180.

In S172, the telephone number detected by the signal line 14a is checked by the circuit 62. If the facsimile communication has been selected, the process proceeds to S102 of FIG. 4, and if the speech communication has been selected, the process proceeds to S120 of FIG. 5B.

In S178, whether the call signal ringing pattern has been detected or not is determined. If detected, the process proceeds to S180, and if not detected, the process proceeds to S172.

In S180, the detected call signal ringing pattern is checked by the circuit 60. If the facsimile communication has been selected, the process proceeds to S102 of FIG. 4, and if the speech communication has been selected, the process proceeds to S120 of FIG. 5B.

In S186, a similar process as that of S112 and S114 of FIG. 5B is conducted. In S188, whether the sub-address information attribute information has been detected in the V.8 pre-protocol or not is determined, and if the the sub-address information has been detected, the process proceeds to S116 of FIG. 5B, and if not detected, the process proceeds to S190.

In S190, the information of the circuit 54 is received to check the third priority of the fax/tel switching method. If the information is the call signal ringing pattern, the process proceeds to S180, and if the information is the telephone number between call signals, the process proceeds to S172.

In the registration circuit 64, for the fax, for example, the low order three bits (attribute information) of a call function of the V.8 CI (categories for indicator) signal and CM (categories for menu) signal are set to 001 or 101, and for the tel, the low order three bits of the call function of the V.8 CI signal and CM signal are set to 000.

Specifically, in S116 of FIG. 5B, when the low order three bits of the call function of the CI signal and the CM signal are 001 or 101, the process proceeds to S118 to conduct the facsimile communication, and when the low order three bits of the call function of the CI signal and the CM signal are 000, the process proceeds to S120 to call the operator.

Alternatively, in the registration circuit 64, for the fax for example, the low order three bits (sub-address information) of the terminal sub-address of the V.8 CI signal and CM signal are set to 000, and for the tel, the low order three bits of the terminal sub-address of the V.8 CI signal and CM signal are set to 001.

Specifically, in S116 of FIG. 5B, when the low order three bits of the terminal sub-address of the CI signal and the CM signal are 000, the process proceeds to S118 to conduct the facsimile communication, and if the low order three bits of the terminal sub-address of the CI signal and the CM signal are 001, the process proceeds to S120 to call the operator.

In the present embodiment, the call functions of the CI signal and the CM signal are of the same information and the terminal sub-addresses of the CI signal and the CM signal are of the same information.

Contents of the V.8 signal and the call function signal are shown below.

TABLE 1/V.8 Categories for indicator and menu sequences

| 1 | 1111 | 1 | 111 | 1 | Ten ONEs preamble to precede each sequence |
|---|---|---|---|---|---|
| start | Tag | | | stop | Information categories |
| 0 | 0000 | 0 | 000 | 1 | Synchronization octet for CI AND AI sequences |
| 0 | 0000 | 0 | 111 | 1 | Synchronization octet for CM and JM sequences |
| 0 | 1000 | 0 | xxx | 1 | Call function indicating one of 8 call functions (se TABLE 1. callf/V.8) |
| 0 | 0100 | 0 | xxx | 1 | Terminal sub-addressing |
| 0 | 1010 | 0 | xxx | 1 | Modulation modes (see TABLE 1. modn/V.8) |
| 0 | 0101 | 0 | xxx | 1 | Reserved by ITU-T for Protocols (eg T.30 or V.42) |
| 0 | 0011 | 0 | xxx | 1 | Network interaction (eg G.164/G.165 disabling indicated in CI) |

(information categories not so far defined are all reserved for future use by the ITU-T)

TABLE 1.callf/V.8 The call function category

| start | | | | |
|---|---|---|---|---|
| 0 | 1000 | | | Call function - octet 'callf' |
| | | 0 | | indicates a tagged category octet and prevents flag simulation |
| | | | 000 | telephone (eg for return to voice) |
| | | | 100 | reserved by the ITU-T |
| | | | 010 | textphone |
| | | | 110 | reserved by the ITU-T |
| | | | 001 | transmit facsimile from the call terminal |
| | | | 101 | receive facsimile at the call terminal |
| | | | 011 | transmit and receive data |
| | | | 111 | as given by an extension octet |
| | | | 1 | stop bit |

As described hereinabove, the receiving station may conform the switching of the facsimile communication or the speech communication to that of the other facsimile apparatus in the network so that the proper switching of the facsimile communication and the speech communication is attained.

When the other facsimile apparatus in the network cannot send the selected terminal identification with the first priority, the switching of the facsimile communication and the speech communication may be attained by the second or lower priority The present invention is not limited to the above embodiments, and various modifications thereof may be made without departing from the spirit and scope of the invention.

What is claimed is:

1. A communication apparatus capable of selectively using a single communication line for data communication and speech communication, comprising:
   data communication means for conducting data communication;
   receiving means for receiving a V.8 protocol signal comprising call function data including attribute information and terminal sub-address data including sub-address information; and
   control means for identifying whether a station to communicate with is a data communication terminal or a speech communication terminal based on at least one of the attribute information and the sub-address information received at the reception of a call signal and controlling said data communication means in accordance with the identification result.

2. A communication apparatus according to claim 1 further comprising first detection means for detecting a type of call signal from said communication line wherein said control means controls said data communication means in accordance with the type of call signal detected by said first detection means.

3. A communication apparatus according to claim 2 further comprising second detection means for detecting identification information for identifying a calling terminal from said communication line received at the reception of the call together with the call signal, and memory means for in advance storing information indicating whether the data communication is to be conducted or the speech communication is to be conducted in accordance with the identification information of the calling station wherein said control means controls said data communication means in accordance with the identification information detected by said second detection means and the information stored in said memory means.

4. A communication apparatus capable of selectively using a single communication line for data communication and speech communication, comprising:
   data communication means for conducting data communication;
   first detection means for detecting a type of call signal from said communication line;
   receiving means for receiving a V.8 protocol signal comprising call function data including attribute information and terminal sub-address data including sub-address information; and control means for selecting one of a plurality of modes including a first mode for identifying whether a station to communicate with is a data communication terminal or a speech communication terminal in accordance with the type of call signal detected by said first detection means and a second mode for identifying whether a station to communicate with is the data communication terminal or the speech communication terminal in accordance with at least one of the attribute information and the sub-address information received by said receiving means, and controlling said data communication means in accordance with the selected mode.

5. A communication apparatus according to claim 4 further comprising second detection means for detecting identification information for identifying a calling terminal from said communication line received at the reception of the call together with the call signal and memory means for in advance storing information indicating whether the data communication is to be conducted or the speech communication is to be conducted in accordance with the identification information of the calling station wherein said control means has a third mode for identifying whether the station to communicate with is the data communication terminal or the speech communication terminal in accordance with the identification information detected by said second detection means and the information stored in said memory means.

6. A communication apparatus according to claim 4 further comprising setting means for setting a priority of selection of said modes wherein said control means selects the mode in accordance with the priority set by said setting means.

7. A communication method for selectively using a single communication line for data communication and speech communication, comprising the steps of:

receiving a V.8 protocol signal comprising call function data including attribute information and terminal sub-address data including sub-address information; and identifying whether a station to communicate with is a data communication terminal or a speech communication terminal at the reception of a call signal in accordance with at least one of the received attribute information and the received sub-address information;

selectively conducting the data communication and the speech communication in accordance with the identification result.

8. A communication method according to claim 7 further comprising the steps of detecting a type of call signal from said communication line, and identifying whether the station to communicate with is the data communication terminal or the speech communication terminal in accordance with the detected type of call signal.

9. A communication method according to claim 8 further comprising the steps of detecting identification information for identifying a calling terminal received together with the call signal from said communication line, and identifying whether the station to communicate with is the data communication terminal or the speech communication terminal in accordance with the detected identification information.

10. A communication method according to claim 9 wherein said conduction step selects one of a plurality of identification processes and selectively conducts the data communication and the speech communication in accordance with the identification result of the selected identification process.

11. A communication method according to claim 10 further comprising the step of setting a priority to the selection of the identification processes wherein said conduction step selects one of the identification processes in accordance with the priority.

* * * * *

UNITED STATES PATENT AND TRADEMARK OFFICE
CERTIFICATE OF CORRECTION

PATENT NO. : 5,966,430
DATED : October 12, 1999
INVENTOR(S) : TAKEHIRO YOSHIDA

It is certified that error appears in the above-identified patent and that said Letters Patent is hereby corrected as shown below:

COLUMN 2

Line 27, "is a flow charts" should read --are a flow chart--;
    Line 36, "of" should read --on--; and
    Line 67, "off hook off" should read --off-hook--.

COLUMN 3:

Line 1, "off hook," should read --off-hook,--; and
    Line 2, "on hook," should read --on-hook,--.

COLUMN 6:

Line 23, "been-selected," should read --been selected,--.

COLUMN 7:

Line 21, "attribute information" should read --(attribute information)--.

COLUMN 9:

Table 1, "AND" should read --and--.

UNITED STATES PATENT AND TRADEMARK OFFICE
CERTIFICATE OF CORRECTION

PATENT NO.   : 5,966,430
DATED        : October 12, 1999
INVENTOR(S)  : TAKEHIRO YOSHIDA It is certified that error appears in the above-identified patent and that said Letters Patent is hereby corrected as shown below:

COLUMN 10:

Line 14, "identification" should read --identification signal-- and "priority" should read --priority.--. and "the" should read --The--.

Signed and Sealed this

Fifteenth Day of August, 2000

Q. TODD DICKINSON

Attest:

Attesting Officer

Director of Patents and Trademarks